United States Patent
Matsuyama

(10) Patent No.: US 9,315,684 B2
(45) Date of Patent: *Apr. 19, 2016

(54) INK COMPOSITION, INKJET RECORDING METHOD, AND PRINTED MATTER

(71) Applicant: Ricoh Company, Ltd., Tokyo (JP)

(72) Inventor: Akihiko Matsuyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,993

(22) Filed: May 12, 2015

(65) Prior Publication Data

US 2015/0247047 A1 Sep. 3, 2015

Related U.S. Application Data

(63) Continuation of application No. 13/913,626, filed on Jun. 10, 2013, now Pat. No. 9,056,993.

(30) Foreign Application Priority Data

Jul. 10, 2012 (JP) ................................. 2012-154426

(51) Int. Cl.
*C09D 11/322* (2014.01)
*B41J 2/17* (2006.01) *C09D 11/326* (2014.01)
*C08K 5/3437* (2006.01)

(52) U.S. Cl.
CPC ............ *C09D 11/322* (2013.01); *C08K 5/3437* (2013.01); *C09D 11/326* (2013.01); *Y10T 428/24901* (2015.01)

(58) Field of Classification Search
CPC ..................... C09D 11/322; Y10T 428/24901; B41J 2/17; B41J 2/17503; B41J 2/17509
USPC .................. 106/31.77, 31.78, 31.85
See application file for complete search history.

(56) References Cited

U.S. PATENT DOCUMENTS

| | | | |
|---|---|---|---|
| 8,945,294 B2 * | 2/2015 | Matsuyama et al. | 106/31.86 |
| 9,028,600 B2 * | 5/2015 | Goto et al. | 106/31.75 |
| 2006/0170745 A1 | 8/2006 | Deroover et al. | |
| 2009/0035468 A1 | 2/2009 | Matsuyama et al. | |
| 2009/0043028 A1 | 2/2009 | Matsuyama et al. | |
| 2009/0047431 A1 | 2/2009 | Hatada et al. | |
| 2009/0098312 A1 | 4/2009 | Goto et al. | |
| 2009/0176070 A1 | 7/2009 | Goto et al. | |
| 2009/0186162 A1 | 7/2009 | Namba et al. | |
| 2009/0297712 A1 | 12/2009 | Kasahara et al. | |
| 2010/0285287 A1 | 11/2010 | Matsuyama et al. | |
| 2011/0057981 A1 | 3/2011 | Aruga et al. | |
| 2011/0205288 A1 | 8/2011 | Matsuyama et al. | |
| 2011/0216123 A1 | 9/2011 | Tamai et al. | |
| 2012/0098883 A1 | 4/2012 | Matsuyama et al. | |
| 2012/0207983 A1 | 8/2012 | Matsuyama et al. | |
| 2012/0236066 A1 | 9/2012 | Tamai et al. | |
| 2012/0262517 A1 | 10/2012 | Takaku et al. | |
| 2012/0293582 A1 | 11/2012 | Goto et al. | |
| 2012/0320133 A1 | 12/2012 | Namba et al. | |
| 2012/0328853 A1 | 12/2012 | Matsuyama et al. | |
| 2012/0328854 A1 | 12/2012 | Matsuyama et al. | |
| 2013/0002776 A1 | 1/2013 | Nagashima et al. | |
| 2013/0023614 A1 | 1/2013 | Hatada et al. | |
| 2013/0065028 A1 | 3/2013 | Fujii et al. | |
| 2013/0071637 A1 | 3/2013 | Matsuyama et al. | |
| 2013/0113860 A1 | 5/2013 | Gotou et al. | |
| 2013/0155145 A1 | 6/2013 | Gotou et al. | |
| 2013/0176369 A1 | 7/2013 | Gotou et al. | |
| 2013/0194343 A1 | 8/2013 | Yokohama et al. | |
| 2013/0194344 A1 | 8/2013 | Yokohama et al. | |
| 2013/0323474 A1 | 12/2013 | Gotou et al. | |
| 2014/0002539 A1 | 1/2014 | Goto et al. | |
| 2014/0017461 A1 * | 1/2014 | Matsuyama | 106/31.77 |
| 2014/0065386 A1 | 3/2014 | Matsuyama | |
| 2014/0069295 A1 | 3/2014 | Fujii et al. | |
| 2014/0072779 A1 | 3/2014 | Matsuyama et al. | |

FOREIGN PATENT DOCUMENTS

| | | |
|---|---|---|
| CN | 101203578 A | 6/2008 |
| JP | 2007-169359 | 7/2007 |
| JP | 2007-169470 | 7/2007 |
| JP | 2007-238808 | 9/2007 |
| JP | 2008-163238 | 7/2008 |
| JP | 2009-173696 | 8/2009 |
| JP | 2010-180316 | 8/2010 |

| | | |
|---|---|---|
| JP | 2010-235895 | 10/2010 |
| JP | 2012-107210 A | 6/2012 |
| WO | WO 2012/018098 A1 | 2/2012 |
| WO | WO 2012/124790 A1 | 9/2012 |

OTHER PUBLICATIONS

Chinese Office Action issued Jun. 25, 2014, in China Patent Application No. 201310288186.0.
English translation of JP 2007/169359; Jul. 2007.
U.S. Appl. No. 14/712,472, filed May 14, 2015 Inventor: Matsuyama, et al.
Office Action issued Oct. 1, 2015, in Japanese Patent Application No. 2013-143318 filed Jul. 9, 2013.
Office Action issued Dec. 10, 2015, in Japanese Patent Application No. 2013-143318 filed Jul. 9, 2013.

* cited by examiner

*Primary Examiner* — Helene Klemanski
(74) *Attorney, Agent, or Firm* — Oblon, McClelland, Maier & Neustadt, L.L.P

(57) ABSTRACT

The present invention provides an ink composition that contains a pigment, a dispersant, a hydrosoluble solvent; and water, wherein the pigment is represented by the following chemical formula 1:

Chemical formula 1

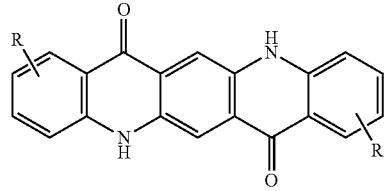

where R represents hydrogen, an alkyl group having one to three carbon atoms, or chlorine,
wherein the ink composition satisfies the following relations 1 and 2:

$$0.050 \leq X/Y \leq 0.120 \quad \text{Relation 1}$$

$$0.700 \leq Z/Y \leq 1.050 \quad \text{Relation 2}$$

where X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm.

12 Claims, 4 Drawing Sheets

INK COMPOSITION, INKJET RECORDING METHOD, AND PRINTED MATTER

CROSS-REFERENCE TO RELATED APPLICATIONS

The present application is a Continuation of U.S. Ser. No. 13/913,626, filed Jun. 10, 2013, now U.S. Pat. No. 9,056,993. This patent application is based on and claims priority pursuant to 35 U.S.C. §119 to Japanese Patent Application No. 2012-154426, filed on Jul. 10, 2012, in the Japan Patent Office, the entire disclosure of which is hereby incorporated by reference herein.

BACKGROUND

1. Technical Field

The present invention relates to an ink composition for inkjet recording, an inkjet recording method, and printed matter.

2. Background Art

Inkjet printers are widely used due to their advantages such as low noise and low running costs, and many printers capable of printing color images on plain paper are now widely available on market. However, it is extremely difficult to satisfy all the properties required of images produced using such printers, such as good color reproducibility, abrasion resistance, durability, light resistance, drying property, feathering, color bleed, duplex printing, and ink discharging stability. As a result, the ink used is selected based on the particular application.

In general, the ink used in inkjet recording is mainly composed of water, with a coloring agent and a wetting agent such as glycerin added to prevent clogging. As the coloring agent, dyes are widely used for their coloring and stability. However, the light resistance and water resistance of images produced using such dye-based ink are inferior. The water resistance can be improved in some degree by using specialized recording media having an ink absorbing layer, but is not satisfactory at all when it comes to plain paper.

To compensate for such defects, ink using a pigment has begun to be widely used as a coloring agent. Although pigment ink is successful and superior to dye ink with regard to light resistance, water resistance, etc., coloring is degraded by coherence of light having difference wavelengths and phases produced by multiple reflections of light within the pigment. Therefore, pigment ink is inferior to dye ink in general with regard to the coloring. In particular, the pigment ink used as ink for inkjet recording causes problems of deterioration of coloring (saturation) on plain paper and of gloss on specialized paper.

In an attempt to compensate for such degradation of coloring of the pigment ink, pigment particulates that are coated with resin are used. According to this method, the fixing and the gas resistance properties of the ink are further improved by the resin, and in addition dispersion is greatly stabilized. However, currently, pigment ink is not still on a par with dye ink with regard to gloss.

JP-2007-169359-A discloses using a quinacridone-based pigment liquid dispersion while limiting the ratio Z/Y of the two absorption peaks Y and Z to a range of from 0.94 to 1.21 to obtain good coloring. JP-2007-238808-A discloses regulating the ratio of the two absorption peaks Y and Z of C.I. Pigment Red 122 to a range of from 0.85 to 1.00 to obtain good coloring. Although these are successful in some degree, just adjusting the range of Z/Y does not lead to improvement of gloss so that the problem about the coloring on specialized gloss paper or coated paper remains unsolved.

SUMMARY

The present invention provides an ink composition that contains a pigment, a dispersant, a hydrosoluble solvent; and water, wherein the pigment is represented by the following chemical formula 1:

Chemical formula 1

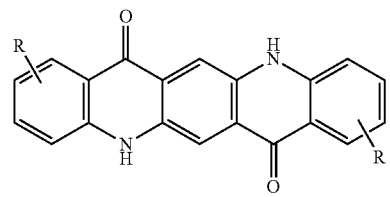

where R represents hydrogen, an alkyl group having one to three carbon atoms, or chlorine, wherein the ink composition satisfies the following relations 1 and 2:

$$0.050 \leq X/Y \leq 0.120 \quad \text{Relation 1}$$

$$0.700 \leq Z/Y \leq 1.050 \quad \text{Relation 2}$$

where X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm.

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
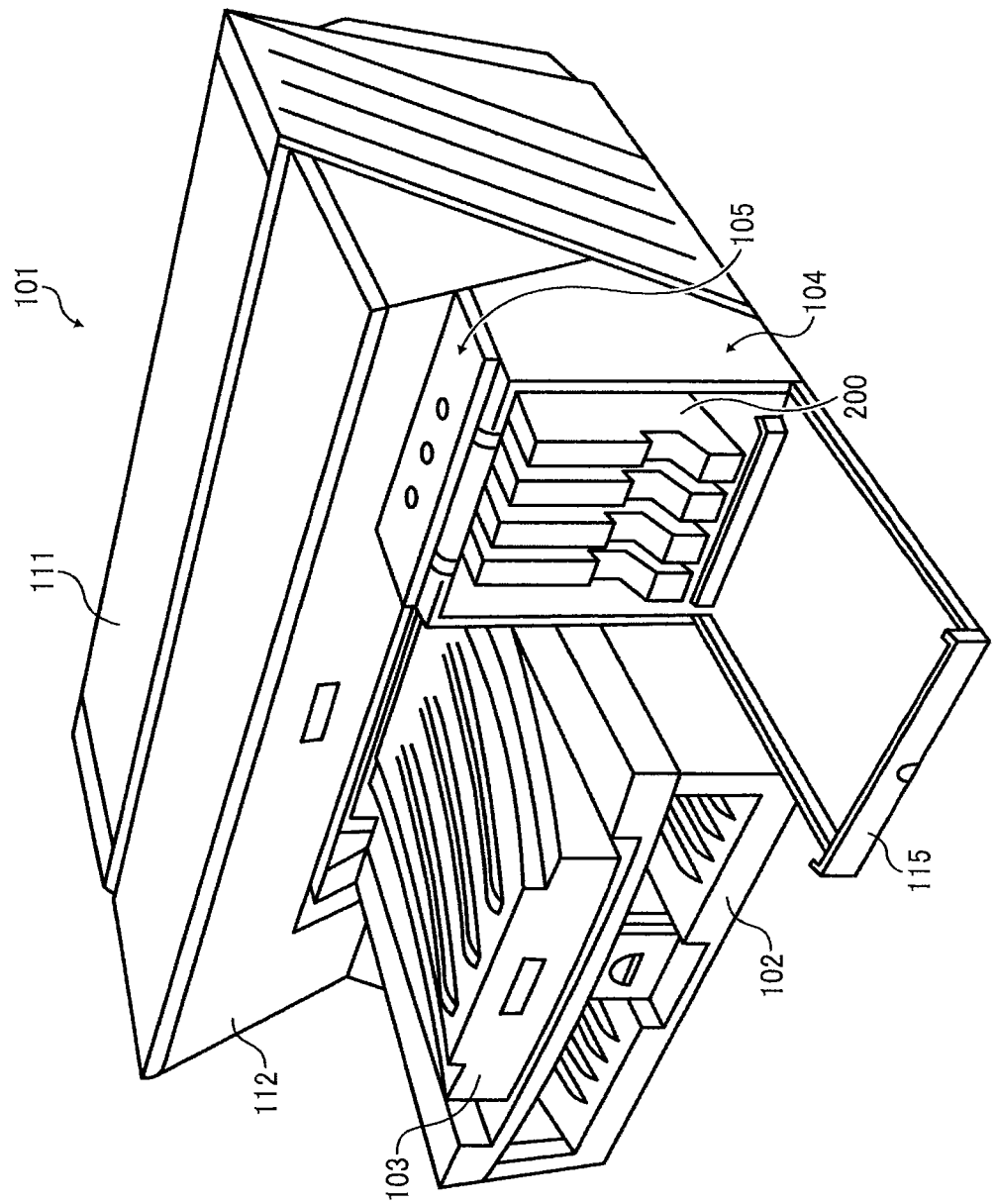
FIG. 1 is a perspective view illustrating an example of an inkjet recording device in which the cover of the ink cartridge installation unit is open.

In the present disclosure, an ink composition, an inkjet recording method, and an inkjet recorded material to impart gloss which is not possibly obtained by using conventional pigment ink and light resistance which is not possibly obtained by using conventional dye ink are described.

The pigment represented by the Chemical Formula 1 is widely used because of its excellent coloring and light resistance but is inferior to a dye in light of the coloring and the gloss.

Chemical formula 1

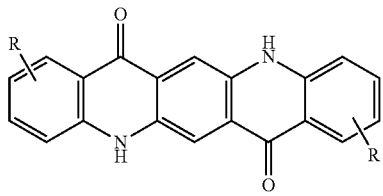

where R represents hydrogen, an alkyl group having one to three carbon atoms, or chlorine.

To improve the coloring, there is a method of reducing the crystallinity of a pigment. As the crystallinity decreases, the absorbance Z of the maximum peak in the wavelength range of from 550 nm to 600 nm lowers. On the other hand, the absorbance Z of the maximum peak in the wavelength range of from 500 nm to 550 nm varies little by a change in the crystallinity. Therefore, the coloring is improved if the value of Z/Y is designed to be 1.050 or less. However, the light resistance deteriorates as the crystallinity decreases, meaning that a pigment loses its superiority over a dye. Therefore, it is suitable to keep the value of Z/Y to be 0.700 or higher. However, just such a control over the crystallinity is not sufficient to improve the coloring of a pigment to the level of a dye and in particular the gloss on specialized gloss paper or coated paper is greatly inferior.

To improve the gloss, it is suitable to lower the minimum absorbance X in the wavelength range of from 400 nm to 450 nm. When the value of X/Y is 0.120 or less, an extremely high gloss is obtained and the coloring is furthermore improved. However, as the value of X/Y decreases, the light resistance deteriorates. Therefore, the value of X/Y is kept 0.050 or more to prevent this deterioration.

Therefore, to provide an ink composition, an inkjet recording method, and printed matter that impart gloss to an image formed on specialized paper or coated paper which is not achieved by a typical pigment ink and light resistance not sufficiently achieved by a typical dye ink, the present inventors thus made an ink composition that contains a pigment represented by the following Chemical Formula 1, a dispersant, a hydrosoluble solvent, and water, wherein the ink composition satisfies the following Relations 1 and 2, X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm:

$$0.050 \leq X/Y \leq 0.120$$ Relation 1

$$0.700 \leq Z/Y \leq 1.050$$ Relation 2

Chemical formula 1

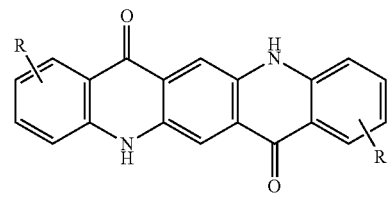

where R represents hydrogen, an alkyl group having one to three carbon atoms, or chlorine.

Pigment

In the embodiment, the quinacridone pigment represented by the Chemical Formula 1 is used.

C.I. Pigment Violet 19 represented by the Chemical Formula 1-1 is a non-substituted quinacridone and C.I. Pigment Red 122 represented by the Chemical Formula 1-2 is a methyl-substituted quinacridone. C.I. Pigment Red 202 represented by the Chemical Formula 1-3, C.I. Pigment Red 209, etc. are chlorine-substituted quinacridones.

Chemical Formula 1-1

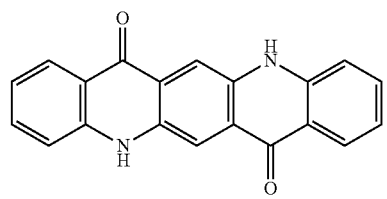

Chemical Formula 1-2

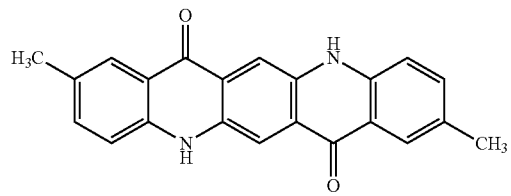

Chemical Formula 1-3

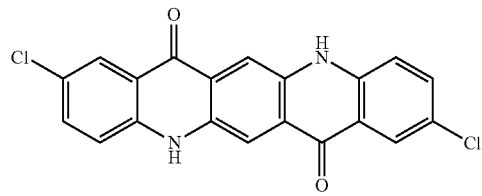

These quinacridone pigments can be used in combination as a form of mix crystal. For example, a mix crystal of a combination of C.I. Pigment Violet 19 and C.I. Pigment Red 122 and a mix crystal of a combination of C.I. Pigment Violet 19 and C.I. Pigment Red 202 are used, by which it is confirmed that coloring is adjusted and the saturation is improved.

To obtain an ink composition satisfying the Relation 2, the primary particle diameter of a pigment is reduced in comparison with a conventional pigment. The primary particle diameter of the pigment is preferably 80 nm or less and more preferably 50 nm or less. To reduce the primary particle diameter, for example, dry pulverizing methods such as salt milling methods and liquid phase laser ablation methods of using a microreactor to precipitate dissolved pigments in a minute reaction field, or microparticulating pigments by irradiation with laser beams are known and applied in the present disclosure.

To obtain an ink composition satisfying the Relation 1, the dispersion particle diameter (average particle diameter of a pigment disperse in liquid) of a pigment is reduced to 100 nm or less and preferably 60 nm or less. The dispersion particle diameter can be reduced by using, for example, a mixing and kneading and dispersing machine using balls such as a bead mill or a ball mill, a mixing and kneading and dispersing machine using a shearing force such as a roll mill, or an ultrasonic dispersion machine. Among these, the bead mill dispersion method using beads having a diameter of 0.05 mm or less.

By reducing the primary particle diameter and the dispersion particle diameter of a pigment and stably maintaining the dispersion state, the ink composition of the present disclosure that satisfies the Relations 1 and 2 is obtained.

The density of the pigment in the ink is preferably from 1 percent by weight to 15 percent by weight, more preferably from 2 percent by weight to 12 percent by weight, and furthermore preferably from 3 percent by weight to 9 percent by weight. When the density of the pigment is 1 percent by weight or more, the coloring is sufficient, thereby improving the image density and the saturation. In addition, when the density of the pigment is 15 percent by weight or less, the storage stability of the ink is secured, thereby avoiding dullness of images.

Dispersant

There is no specific limit to the dispersant for use in the present disclosure. Any of the dispersants for use in preparation of the liquid dispersion of pigment can be suitably selected.

For example, nonion surfactants such as polyoxyethylene isodecyl ether, polyoxyethylene lauryl ether, polyoxyethylene β naphtyl ether, polyoxy ethylene styryl phenyl ether, and polyoxy ethylene distyryl phenyl ether and anion surfactant such as polyoxyethylene lauryl ether sulfuric acid salts, polyoxyethylene β naphtyl ether sulfuric acid salts, polyoxyethylene styryl phenyl ether phosphoric acid salts, polyoxyethylene distyryl phenyl carboxylic acid salts, lauryl ether phosphoric acid salts, octyl ether carboxylic acid salts, distyryl phenyl ether sulfuric acid salts, styryl phenyl ether phosphoric acid salts, and β naphtyl ether carboxylic acid salts can be used as the dispersants.

In the present disclosure, the dispersant represented by the following Chemical Formula 2 is particularly suitable.

$$A^1-O-B^1 \qquad \text{Chemical Formula 2}$$

In the Chemical Formula 2, $A^1$ represents a linear or branched alkyl group having 8 to 12 carbon atoms, β-naphtyl group, styrenized phenolic group, or distyrenized phenolic group, $B^1$ represents a $COOM^1$, an $SO_3M^1$, or a $PO_3M^1{}_2$, where $M^1$ represent Na, K, ammonium, tetramethyl ammonium, or ethanol amine.

Specific examples of the dispersants represented by the Chemical Formula 2 include, but are not limited to compounds represented by the Chemical Formulae 2-1, 2-2, 2-3, 2-4, and 2-5.

TABLE 1

| Chemical Formula | $A^1$ | $B^1$ | $M^1$ |
| --- | --- | --- | --- |
| 2-1 | B naphtyl | $COOM^1$ | Tetramethyl ammonium |

TABLE 1-continued

| Chemical Formula | $A^1$ | $B^1$ | $M^1$ |
| --- | --- | --- | --- |
| 2-2 | Distyrenized phenol | $SO_3M^1$ | Ammonium |
| 2-3 | Linear alkyl (C = 12) | $PO_3M^1{}_2$ | Na |
| 2-4 | Linear alkyl (C = 8) | $CCOM^1$ | K |
| 2-5 | Styrenized phenol | $PO_3M^1{}_2$ | Ethanol amine |

It is also possible to use polymer dispersants such as polyacrylic acids, polymethacrylic acids, copolymers of acrylic acid and acrylonitrile, copolymers of vinyl acetate and an acrylic acid ester, copolymers of acrylic acid and an acrylic acid alkyl ester, copolymers of styrene and acrylic acid, copolymers of styrene and methacrylic acid, copolymers of styrene, acrylic acid, and an acrylic acid alkyl ester, copolymers of styrene, methacrylic acid, and an acrylic acid alkyl ester, copolymers of styrene, α-methyl styrene, and an acrylic acid, copolymer of styrene, α-methyl styrene, and acrylic acid-copolymers of an acrylic acid alkyl ester, copolymers of styrene and maleic acid, copolymers of vinyl naphthalene and maleic acid, copolymers of vinyl acetate and ethylene, copolymers of vinyl acetate and aliphatic acid vinyl ethylene, copolymers of vinyl acetate and a maleic acid ester, copolymers of vinyl acetate and crotonic acid, copolymers of vinyl acetate and acrylic acid, copolymers of acrylic and silicone, and modified polyurethane resins. These dispersants can be used alone or in combination.

In the present disclosure, the dispersant represented by the following Chemical Formula 3 is particularly suitable.

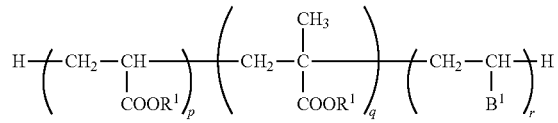

Chemical Formula 3

In the Chemical Formula 3, p, q, and r independently represent counting numbers of from 5 to 50, $B^1$ represents $COOM^1$, an $SO_3M^1$, or a $PO_3M^1{}_2$, where $M^1$ represents Na, K, ammonium, tetramethyl ammonium, or ethanol amine.

In addition, $R^1$ represents the following polysiloxane structure.

Chemical Formula 3

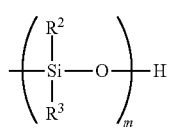

Chemical Formula $R^1$

In the Chemical Formula $R^1$, $R^2$ represents a hydroxyl group, a methoxy group, or an ethoxy group, $R^3$ represents a methyl group, an ethyl group, a hexyl group, a hydroxymethyl group, or a hydroxyethyl group, and m represents a counting number of from 1 to 10.

Specific examples of the dispersants represented by the Chemical Formula 3 include, but are not limited to compounds represented by the Chemical Formulae 3-1, 3-2, 3-3, 3-4, and 3-5.

TABLE 2

| Chemical Formula | B1 | $M^1$ | $R^2$ | $R^3$ | p | q | r | m |
|---|---|---|---|---|---|---|---|---|
| 3-1 | $PO_3M^1_2$ | Ammonium | OH | Hydroxymethyl | 5 | 5 | 5 | 10 |
| 3-2 | $COOM^1$ | Ethanol amine | OH | Hexyl | 50 | 50 | 50 | 6 |
| 3-3 | $SO_3M^1$ | Na | Ethoxy | Hydroxyethyl | 35 | 25 | 30 | 1 |
| 3-4 | $COOM^1$ | K | Methoxy | Ethyl | 50 | 25 | 5 | 6 |
| 3-5 | $PO_3M^1_2$ | Tetraethyl ammonium | OH | Methyl | 32 | 5 | 30 | 3 |

The dispersant represented by the Chemical Formula 3 illustrated above is obtained by polymerizing an acrylic monomer and a silane compound. Specific examples of the acrylic monomers include, but are not limited to, acrylic acid ester monomers such as methyl acrylate, ethyl acrylate, butyl acrylate, 2-ethylhexyl acrylate, 2-hydroxyethyl acrylate, acryloyl morphorine, and N,N'-dimethyl amino ethyl acrylate; methacrylic acid ester monomers such as methyl methacrylate, ethyl methacrylate, butyl methacrylate, 2-ethylhexyl methacrylate, 2-hydroxyethyl methacrylate, and N,N'-dimethyl amino ethyl acrylate; amide acrylates such as N-methylol acrylic amide and methoxymethyl acrylic amide; and carboxylic acid-containing monomers such as maleic acid, fumaric acid, itaconic acid, acrylic acid, and methacrylic acid.

Monomers generally known as silane coupling agents are suitably used as polysiloxane of the Chemical Formula $R^1$. Specific examples thereof include, but are not limited to, vinyl trimethoxy silane, vinyl triethoxy silane, 3-methacryloxy propyl methyl dimethoxy silane, 3-methacryloxy propyl trimethoxy silane, 3-methacyloxy propyl triethoxy silane, 3-acryloxypropyl trimethoxy silane, N-2(aminoethyl)3-aminopropyl methyl dimethoxy silane, N-2(aminoethyl)3-aminopropyl trimethoxy silane, N-2(aminoethyl)3-aminopropyl triethoxy silane, 3-amino propyl trimethoxysilane, 3-amino propyl triethoxysilane, 3-trietoxy silyl-N-(1,3-dimethyl-butylidene)propyl amine, N^phenyl-3-aminopropyl methoxy silane, chlorides of N-(vinyl benzyl)-2-aminoethyl-3-aminopropyl trimethoxy silane, 3-ureido propyl triethoxy silane, 3-chloropropyl trimethoxy silane, 3-mercapto propyl methyl dimethoxy silane, 3-mercapto propyl trimethoxy silane, bis) triethoxysilyl propyl)tetrasulfide, and 3-isocyanate propyl triethoxy silane.

A pigment dispersion element can be prepared by dissolving the dispersant mentioned above in an aqueous medium, adding the pigment to the solution followed by sufficient moistening, and mixing and kneading and dispersing the resultant by high speed stirring by a homogenizer, a disperser using balls such as a bead mill and a ball mill, a mixing and kneading disperser using a shearing force such as a roll mill, or an ultrasonic disperser. However, after such a dispersion process, coarse particles are contained in most cases, which causes clogging in the inkjet nozzle or the supplying route. Therefore, it is suitable to remove such coarse particles (e.g., particle diameter: 1 μm or greater) by a filter or a centrifugal.

In the present disclosure, it is preferable to use the dispersant in an amount of 10% by weight to 100% by weight and, more preferable, from 20% by weight to 50% by weight to the pigment. When the amount of the dispersant is 10% by weight or more, the pigment can be microparticulated sufficiently. In addition, when the amount of the dispersant is 100% by weight or less, the extra component that is not attached to the pigment can be reduced, thereby avoiding an adverse impact on the ink property so that image blur and deterioration of water resistance and abrasion resistance are prevented.

In addition, the content of the dispersed particulate in the ink is preferably from about 2% by weight to about 20% by weight and more preferably from 3% by weight to 15% by weight as the solid portion of the total of the pigment and the dispersant.

Aqueous Solvent

The ink of the present disclosure is prepared by using water as a liquid medium. As the wetting agent to prevent the ink from drying, improve the dispersion stability, and prevent curling of plain paper, the following aqueous solvents are used. These aqueous solvents can be used in combination.

Specific examples thereof include, but are not limited to the following:

Polyols such as glycerin, ethylene glycol, diethylene glycol, isopropylidne glycerol, 1,3-butane diol, 3-methyl-1,3-butane diol, triethylene glycol, propylene glycol, dipropylene glycol, trimethylol propane, trimethylol ethane, ethylene glycol, diethylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6 -hexane triol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoetyl ether, diethylene glycol monobutyl ether, tetraethylene glycol monometyl ether, and propylene glycol monoethyl ether; polyol aryl ethers such as ethylene glycol monophenyl ether, and ethylene glycol monobenzyl ether; nitrogen-containing heterocyclic compounds such as 2 -pyrrolidone, N-methyl-2-pyrrolidone, N-hydroxyethyl-2- pyrrolidone, 1,3-dimethyl imidazolidinone, ε-caprolactone, and γ-butylolactone; amides such as formamide, N-methylformamide, N,N-dimethylformamide, N,N-dimethyl β-methoxy propionamide, and N,N-dimethyl-βbutoxy propionamide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; 3-ethyl-3-hydroxymethyl oxetane, propylene carbonate, and ethylene carbonate.

Among these aqueous solvents, 3-ethyl-3-hydroxy-methyloxetane, isopropylidene glycerol, N,N-dimethyl-βmethoxy propionamide, and N,N-dimethylβbutoxy propionamide are particularly preferable. These are excellent to prevent curling of plain paper.

Sugar groups can be also contained in the wetting agent in the present disclosure.

Specific examples of the sugar groups include, but are not limited to, monosaccharides, disaccharides, oligosaccharides (including trisaccharides and tetrasaccharides), and polysaccharides. Preferred specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above. Sugar alcohols are particularly preferable and specific examples thereof include, but are not limited to, maltitol and sorbit.

The blend ratio of the pigment and the wetting agent has a large impact on the discharging stability of ink discharged from a head. If the blending amount of the wetting agent is too small while the ratio of the solid pigment portion is high, water evaporation around ink meniscus of nozzles tends to be accelerated, resulting in bad discharging performance. The blending ratio of the wetting agent is preferably from 10% by weight to 70% by weight and more preferably from 20% by weight to 50% by weight based on the ink. The ink having such a content ratio is extremely good about the test for drying, preservation, and reliability.

Penetrating Agent

By adding a penetrating agent to the ink, the surface tension lowers so that the ink filling property of the ink to the nozzles and the discharging stability ameliorate. In addition, since the ink droplets quickly penetrate into a recording medium after the ink droplets have landed thereon, feathering and color bleed are reduced. Surfactants and solvents having a penetrating property are used as the penetrating agent.

The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds. Among these, the fluorine-based surfactants represented by Chemical Formula 5 are particularly preferably used.

Chemical Formula 5

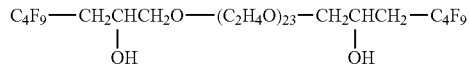

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Among these, SURFYNOL® 104, 465, and TG are particularly good to demonstrate good printing quality.

Specific examples of the solvents having a penetrating property include, but are not limited to, polyols having eight or more carbon atoms such as 2-ethyl-1,3-hexane diol, and 2,2,4-trimethyl-1,3-pentane diol and glycol ethers.

These surfactants may be used alone or in combination. In the present disclosure, it is preferable to use the penetrating agent in an amount of from 0.01% by weight to 100% weight and, more preferable, from 0.03% weight to 2% weight based on the entire ink. When the content of the surfactant is too small, spreading of dots after printing tends to be poor, i.e., resulting in dots having small diameters so that filling-in in a solid image is not good, thereby degrading the image density and color saturation. When the content of the surfactant is too large, the ink tends to foam, which leads to clogging in the flowing path in the nozzle, resulting in prevention of discharging ink.

Known additives such as pH adjusters, anti-septic and anti-fungal agents, anti-corrosion agents, anti-oxidants, ultraviolet absorbers, oxygen absorbers, light stabilizers, and anti-kogation agents can be optionally added to the ink composition of the present disclosure.

pH Adjuster

The pH adjuster is added to stabilize the dispersion state and ink discharging by maintaining the ink in the state of alkali. However, when the pH is too high, the head of inkjet and an ink supplying unit tends to be dissolved easily, which results in modification, leakage, bad discharging performance of the ink, etc. It is more desirable to add a pH adjuster when the pigment is mixed and kneaded and dispersed together with a dispersant in water than when additives such as a wetting agent and a penetrating agent are added after mixing, kneading, and dispersing. This is because the pH adjuster may disrupt the dispersion.

The pH adjuster is preferable to contain at least one of an alcohol amine, an alkali metal hydroxide, an ammonium hydroxide, a phosphonium hydroxide, and an alkali metal carbonate. Specific examples of alcohol amines include, but are not limited to, diethanol amine, triethanol amine, and 2-amino-2-ethyl-1,3-propane diol. Specific examples of the alkali metal hydroxides include, but are not limited to, lithium hydroxide, sodium hydroxide, and potassium hydroxide. Specific examples of the ammonium hydroxides include, but are not limited to, ammonium hydroxide, quaternary ammonium hydroxide, and quaternary phosphonium hydroxide. Specific examples of the alkali metal carbonates include, but are not limited to, lithium carbonate, sodium carbonate, and potassium carbonate.

Anti-Septic and Anti-Fungal Agent

Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Anti-Corrosion Agent

Specific examples of the anti-corrosion agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Anti-Kogation Agent

An anti-kogation agent may be added to the ink composition of the present disclosure to prevent kogation.

Kogation is a problematic phenomenon occurring to a thermal head that discharges ink (recording liquid) by utilizing a force of foaming of the ink caused by instant heating upon application of an electric current in a heater. That is, the ink compositions modified by heating adhere to the heater. If kogation occurs, the heater cannot conduct heating properly so that the ink discharging weakens and the ink is not discharged at the worst. Therefore, an anti-kogation agent is added to the ink composition of the present disclosure to prevent kogation.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group, a methylene group, and a carboxylic group.

Recording Device

The ink composition of the present disclosure can be suitably applied to recording systems employing inkjet recording system such as printers, facsimile machines, photocopiers, multi-functional machines (printer/facsimile/photocopier) for inkjet recording.

Inkjet recording devices, which were used in Examples described later, are described below.

The inkjet recording device illustrated in FIG. 1 has a main part 101, a sheet feeder tray 102 to feed recording media placed in the main part 101, a discharging tray 103 attached to the main part 101, which stores the recording media on which images are recorded (formed), and an ink cartridge inserting unit 104. On the upper surface of the ink cartridge inserting unit 104 is arranged an operating unit 105 such as operation keys and a display. The ink cartridge inserting unit 104 has a front cover 115 that is openable and closable to detach and attach an ink cartridge 200. 111 represents an upper cover and 112 represents the front surface of the front cover.

Figure 2:
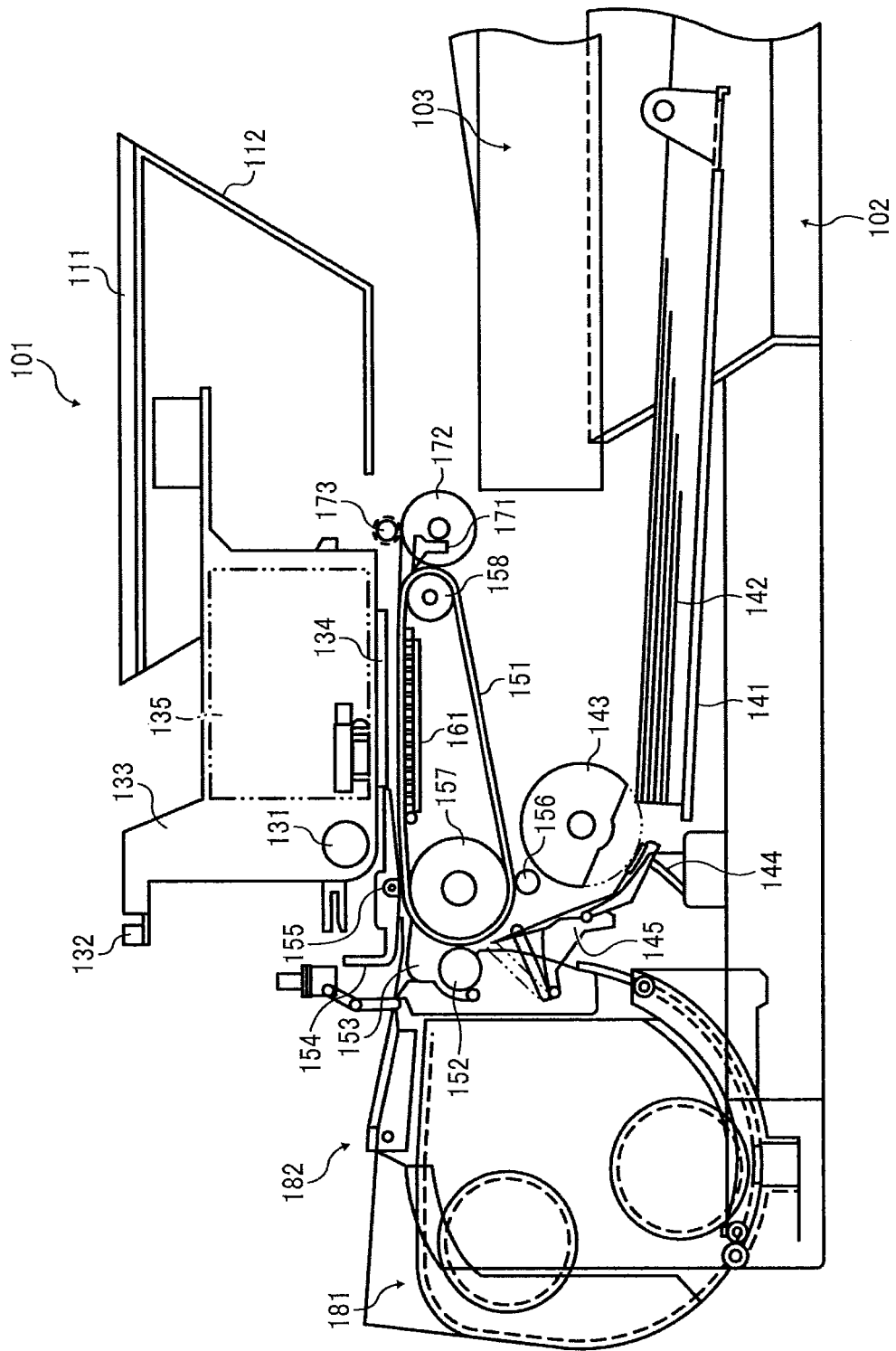
FIG. 2 is a cross-sectional view illustrating the entire configuration of the ink jet recording device.

Inside the main part 101, as illustrated in FIG. 2, a guide rod 131 and a stay 132 serving as guiding members that laterally bridge side plates provided on the right side and left side hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

For example, it is possible to discharge and spray the ink composition as droplets from the recording head by the pressure of the foam generated by thermal energy provided to the ink composition by a thermal head or the like. Moreover, it is possible to conduct inkjet recording by discharging and spraying droplets by imparting mechanical energy to the ink composition by piezoelectric elements or transforming the vibration plate by electrostatic force.

In addition, the carriage 133 has sub-tanks 135 to supply each color ink to the recording head 134. The ink for inkjet recording of the present disclosure is supplied and replenished to the sub-tank 135 from the ink cartridge 200 mounted onto the ink cartridge inserting unit 104 via a tube for supplying ink.

A sheet feeding unit to feed a sheet 142 loaded on a sheet loader (pressure plate) 141 of the sheet feeder tray 102 includes a roller (sheet feeding roller 143) having a half-moon like form to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 move on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 is an endless form belt, suspended between a transfer roller 157 and a tension roller 158 and rotatable in the belt transfer direction. This transfer belt 151 include, for example, a top layer serving as a sheet adsorption surface made of a resin material such as a copolymer (ETFE) of tetrafluoroethylene and ethylene with no resistance control treatment while having a thickness about 40 μm, and a bottom layer (moderate resistance layer, earth layer) made of the same material as the top layer with resistance control treatment with carbon. On the rear side of the transfer belt 151, a guiding member 161 is arranged corresponding to the printing area by the recording head 134. A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 173.

A duplex printing sheet feeding unit 181 is detachably attached to the rear side of the main part 101. The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end of the sheet 142 is guided by the transfer guide 153 and pressed against the transfer belt 151 by the front end pressure roller 155 to change the transfer direction by substantially 90 °.

Since the transfer belt 151 is charged by the charging roller 156 at this point in time, the sheet 142 is electrostatically adsorbed to the transfer belt 151 and transferred. By driving the recording head 134 according to the image signal while moving the carriage 133, the ink droplet is discharged to the sheet 142 not in motion to record an image for an amount corresponding to one line and thereafter the sheet 142 is transferred in a predetermined amount to be ready for the recording for the next line. On receiving a signal indicating that the recording has completed or the rear end of the sheet 142 has reached the image recording area, the recording operation stops and the sheet 142 is discharged to the discharging tray 103.

When the remaining amount of the ink for inkjet recording in the sub-tank 135 is detected as "approaching to empty", a predetermined amount of the ink for inkjet is replenished to the sub tank 135 from the ink cartridge 200.

In this inkjet recording device, it is possible to dissemble the chassis of the ink cartridge 200 and replace the ink bags therein when the ink for inkjet is used up in the ink cartridge 200. In addition, the ink cartridge 200 stably supplies the ink for inkjet recording even when the ink cartridge 200 is placed upright (on its side) and installed by front loading. Therefore, even when the main part 101 is blocked upside, for example, it is accommodated in a rack or something is placed on the upper surface of the main part 101, the ink cartridge 200 is easily exchanged.

A serial type (shuttle type) in which the carriage scans is used in this description but this description is true in a line-type inkjet recording device having a line type head.

Ink Cartridge

Each ink constituting the inkset can be used in a ink cartridge and any other suitable member can be used in combination.

There is no specific limit to the container. Any form, any structure, any size, and any material can be suitably selected. For example, a container having an ink bag formed of aluminum laminate film, a resin film, etc. can be suitably used.

Figure 3:
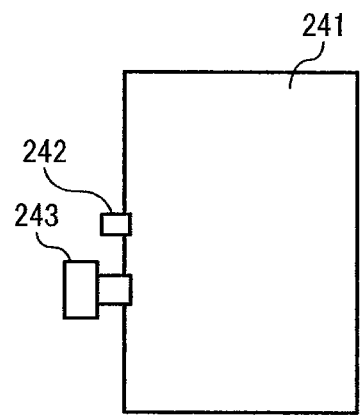
FIG. 3 is a schematic diagram illustrating a variation of the ink cartridge illustrated in FIG. 1.
Figure 4:
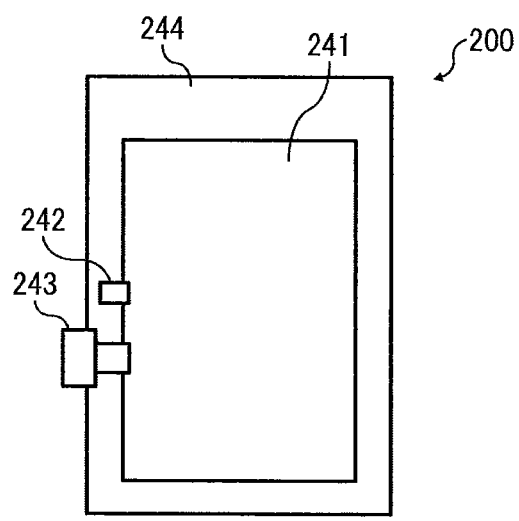
FIG. 4 is a schematic diagram illustrating a variation of the ink cartridge illustrated in FIG. 3.

Next, the ink cartridge is described in detail with reference to FIGS. 3 and 4. FIG. 3 is a schematic diagram illustrating an example of an ink bag 241 of the ink cartridge of the present disclosure. FIG. 4 is a schematic diagram illustrating the ink cartridge 200 that accommodates the ink bag of FIG. 3 in a cartridge case 244.

As illustrated in FIG. 3, the ink bag 241 is filled with the ink from an ink inlet 242. Subsequent to evacuation of air remaining in the ink bag 241, the ink inlet 242 is closed by fusion. When in use, the ink is supplied by piercing the needle attached to the inkjet recording device into an ink outlet 243 made of rubber. The ink bag 241 is formed of a packaging material such as aluminum laminate film having no air permeability. The inkbag 241 is accommodated in a cartridge case 244 made of plastic as illustrated in FIG. 4 and detachably attachable to an inkjet recording device as the ink cartridge 200.

It is particularly preferable that the ink cartridge of the present disclosure is detachably attachable to the inkjet recording device of the present disclosure.

Having generally described (preferred embodiments of) this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLE

Example 1

Dispersion Element 1

The dispersant represented by the Chemical Formula 3-1 was dissolved in deionized water and the pigment (Hostaperm Pink EB trans., manufactured by Clariant Japan K.K.) represented by the Chemical Formula 1-2 was added to the solution for sufficient moistening followed by pre-dispersion by an ultrasonic homogenizer for 10 minutes. The resultant was placed in an ultra aspec mill (UAMO 15 type, manufactured by KOTOBUKI INDUSTRIES CO., LTD.) to conduct dispersion for two hours. The thus-obtained dispersion element was filtered with a filter having an opening of 1 μm to obtain a Dispersion Element 1 having a pigment concentration of 15% by weight.

Ink Recipe

| | |
|---|---|
| Dispersion Element 1 | 40.0 parts |
| Glycerin | 20.0 parts |
| 3-ethyl-3-hydroxymethyl oxetane | 10.0 parts |
| N,N-dimethyl-β-methoxy propion amide | 10.0 parts |
| 2-ethyl-1,3-hexane diol | 2.0 parts |
| Surfactant represented by the Chemical Formula 5 | 0.05 parts |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 17.35 parts |

The materials other than the Dispersion Element 1 was dissolved in deionized water to manufacture a vehicle and thereafter the vehicle was mixed with the Dispersion Element 1 followed by filtration with a filter having an opening of 1 μm to obtain Ink for inkjet recording.

Example 2

Dispersion Element 2

Methanol at −20° C. was flown in a flowing amount of 400 ml/min. into a thin-layer reactor sandwiched by rotation disks using a microreactor (ULREA, manufactured by M Technique Co., Ltd.); and a solution at 25° C. in which 30 parts of a pigment (CROMOPHTAL JET MAGENTA DMQ, manufactured by BASF Japan, Ltd.) represented by the Chemical Formula 1-2 were dissolved in 970 parts of strong sulfuric acid in an flowing amount of 10 ml/min. to the rotation disks to precipitate pigment particles; The reaction was conducted for five hours in which concentration of the thus-obtained pigment liquid dispersion by a centrifugal and dilution thereof with deionized water were repeated followed by adjusting the pH of the resultant to be less than 6 to obtain a pigment paste having a pigment concentration of 30% by weight.

6 parts of a dispersant represented by the Chemical Formula 3-2 was dissolved in 44 parts of deionized water followed by mixing with 50 parts of the pigment paste prepared as described above. Thereafter, the resultant was subject to one-hour treatment by an ultrasonic homogenizer followed by filtration of the resultant with a filter having an opening size of 1 μm to obtain a Dispersion Element 2 having a pigment concentration of 15% by weight.

| | |
|---|---|
| Dispersion Element 2 | 40.0 parts |
| Glycerin | 20.0 parts |
| 1,3-butane diol | 5.0 parts |
| Isoprovinylidene glycerol | 10.0 parts |
| N,N-dimethyl-β-butoxy propionamide | 5.0 parts |
| 2-ethyl-1,3-hexane diol | 2.0 parts |
| Surfactant represented by the Chemical Formula 5 | 0.05 parts |

| | |
|---|---|
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 17.35 parts |

The materials other than the Dispersion Element 2 was dissolved in deionized water to manufacture a vehicle and thereafter the vehicle was mixed with the Dispersion Element 2 followed by filtration with a filter having an opening of 1 μm to obtain Ink for inkjet recording.

Example 3

Dispersion Element 3

A Dispersion Element 3 having a pigment concentration of 15% by weight was manufactured in the same manner as in Example 1 except that the pigment of Example 1 was replaced with a mix crystal (CROMOPHTAL JET MAGENTA 3BC, manufactured by BASF Japan, Ltd.) of the compound represented by the Chemical Formula 1-1 and the compound represented by the Chemical Formula 1-2, the dispersant of Example 1 was replaced with the dispersant represented by the Chemical Formula 3-3, and the dispersion processing time of the ultra aspec mill (UAMO 15 type, manufactured by KOTOBUKI INDUSTRIES CO., LTD.) was changed to one hour.

Ink Recipe

| | |
|---|---|
| Dispersion Element 3 | 40.0 parts |
| Glycerin | 20.0 parts |
| Ethylene glycol monobutyl ether | 15.0 parts |
| 2-pyrolidone | 5.0 parts |
| 2-ethyl-1,3-hexane diol | 2.0 parts |
| EMALGEN LS-106 (polyoxyethylene polyoxypropylene alkyl ether, manufactured by KAO CORPORATION), | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 16.4 parts |

The materials other than the Dispersion Element 3 was dissolved in deionized water to manufacture a vehicle and thereafter the vehicle was mixed with the Dispersion Element 3 followed by filtration with a filter having an opening of 1 μm to obtain Ink for inkjet recording.

Example 4

Dispersion Element 4

A Dispersion Element 4 having a pigment concentration of 15% by weight in the same manner as in Example 2 except that the pigment of Example 2 was changed to CINQUASIA VIOLET R RT-101-D (manufactured by BASF Japan LTD.) represented by the Chemical Formula 1-1 and the dispersant was changed to the dispersant represented by the Chemical Stricture 2-1.

Ink Recipe

| | |
|---|---|
| Dispersion Element 4 | 40.0 parts |
| Glycerin | 20.0 parts |
| 3-methyl-1,3-butane diol | 10.0 parts |
| 3-ethyl-3-hydroxymethyl oxetane | 5.0 parts |
| N,N-dimethyl-β-methoxy propion amide | 10.0 parts |
| 2-ethyl-1,3-hexane diol | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 11.4 parts |

The materials other than the Dispersion Element 4 were dissolved in deionized water to manufacture a vehicle and thereafter the vehicle was mixed with the Dispersion Element 4 followed by filtration with a filter having an opening of 1 μm to obtain Ink for inkjet recording.

Example 5

Dispersion Element 5

A Dispersion Element 5 having a pigment concentration of 15% by weight in the same manner as in Example 1 except that the pigment of Example 1 was changed to CINQUASIA MAGENTA RT-355-D (manufactured by BASF Japan LTD.) represented by the compound represented by the Chemical Formula 1-1 and the compound represented by the Chemical Formula 1-3, the dispersant of Example 1 was changed to the dispersant represented by the Chemical Stricture 2-2, and the dispersion processing time of the ultra aspec mill (UAMO 15 type, manufactured by KOTOBUKI INDUSTRIES CO., LTD.) was changed to one hour.

Ink Recipe

| | |
|---|---|
| Dispersion Element 5 | 40.0 parts |
| Glycerin | 20.0 parts |
| 2-pyrolidone | 5.0 parts |
| 3-methyl-1,3-butane diol | 15.0 parts |
| 2-ethyl-1,3-hexane diol | 2.0 parts |
| Surfactant represented by the Chemical Formula 5 | 0.05 parts |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 17.35 parts |

The materials other than the Dispersion Element 5 was dissolved in deionized water to manufacture a vehicle and thereafter the vehicle was mixed with the Dispersion Element 5 followed by filtration with a filter having an opening of 1 μm to obtain Ink for inkjet recording.

Example 6

Dispersion Element 6

A Dispersion Element 6 having a pigment concentration of 15% by weight in the same manner as in Example 1 except that the pigment of Example 1 was changed to CINQUASIA VIOLET R RT-101-D (manufactured by BASF Japan LTD.) represented by the compound represented by the Chemical Formula 1-1, the dispersant of Example 1 was changed to the dispersant represented by the Chemical Stricture 2-3, and the dispersion processing time of the ultra aspec mill (UAMO 15 type, manufactured by KOTOBUKI INDUSTRIES CO., LTD.) was changed to one hour.

Ink Recipe

| | |
|---|---|
| Dispersion Element 6 | 40.0 parts |
| Glycerin | 20.0 parts |
| 1,3-butane diol | 10.0 part |
| 3-methyl-1,3-butane diol | 10.0 parts |
| 2-ethyl-1,3-hexane diol | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 16.4 parts |

The materials other than the Dispersion Element 6 were dissolved in deionized water to manufacture a vehicle and thereafter the vehicle was mixed with the Dispersion Element 6 followed by filtration with a filter having an opening of 1 μm to obtain Ink for inkjet recording.

Example 7

Dispersion Element 7

A Dispersion Element 7 having a pigment concentration of 15% by weight in the same manner as in Example 1 except that the dispersant of Example 1 was changed to a modified polyurethane resin (EFKA-4520, molecular weight: 16,000, manufactured by EFKA Additives Co., Ltd) and the dispersion processing time of the ultra aspec mill (UAMO 15 type, manufactured by KOTOBUKI INDUSTRIES) was changed to one hour.

Ink Recipe

| | |
|---|---|
| Dispersion Element 7 | 40.0 parts |
| Glycerin | 20.0 parts |
| Ethylene glycol monobutyl ether | 10.0 parts |
| Isoprovinylidene glycerol | 5.0 parts |
| N,N-dimethyl-β-butoxy propionamide | 5.0 parts |
| 2-ethyl-1,3-hexane diol | 2.0 parts |
| Surfactant represented by the Chemical Formula 5 | 0.05 parts |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 17.35 parts |

The materials other than the Dispersion Element 7 were dissolved in deionized water to manufacture a vehicle and thereafter the vehicle was mixed with the Dispersion Element 7 followed by filtration with a filter having an opening of 1 μm to obtain Ink for inkjet recording.

Example 8

Dispersion Element 8

A Dispersion Element 8 having a pigment concentration of 15% by weight in the same manner as in Example 3 except that the dispersant of Example 3 was changed to the dispersant represented by the Chemical Formula 4.

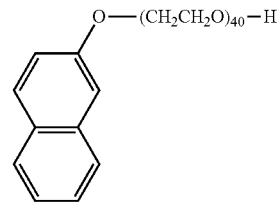

Chemical Formula 4

$$O-(CH_2CH_2O)_{40}-H$$

Ink Recipe

| | |
|---|---|
| Dispersion Element 8 | 40.0 parts |
| Glycerin | 20.0 parts |
| 1,3-butane diol | 20.0 part |
| 2-ethyl-1,3-hexane diol | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 16.4 parts |

The materials other than the Dispersion Element 8 were dissolved in deionized water to manufacture a vehicle and thereafter the vehicle was mixed with the Dispersion Element 8 followed by filtration with a filter having an opening of 1 μm to obtain Ink for inkjet recording.

Example 9

Dispersion Element 9

A Dispersion Element 9 having a pigment concentration of 15% by weight was manufactured in the same manner as in Example 7 except that the dispersant of Example 7 was changed to the dispersant represented by the Chemical Formula 2-4.

| | |
|---|---|
| Dispersion Element 9 | 40.0 parts |
| Glycerin | 20.0 parts |
| Isoprovinylidene glycerol | 5.0 parts |
| N,N-dimethyl-β-methoxy propion amide | 10.0 parts |
| N,N-dimethyl-β-butoxy propionamide | 5.0 parts |
| 2-ethyl-1,3-hexane diol | 2.0 parts |
| Surfactant represented by the Chemical Formula 5 | 0.05 parts |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 17.35 parts |

The materials other than the Dispersion Element 9 were dissolved in deionized water to manufacture a vehicle and thereafter the vehicle was mixed with the Dispersion Element 9 followed by filtration with a filter having an opening of 1 μm to obtain Ink for inkjet recording.

Example 10

Dispersion Element 10

A Dispersion Element 10 having a pigment concentration of 15% by weight was manufactured in the same manner as in Example 8 except that the dispersant of Example 8 was changed to the dispersant represented by the Chemical Formula 2-5.

Ink Recipe

| | |
|---|---|
| Dispersion Element 10 | 40.0 parts |
| Glycerin | 20.0 parts |
| 1,3-butane diol | 20.0 part |
| 2-ethyl-1,3-hexane diol | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 16.4 parts |

The materials other than the Dispersion Element 10 were dissolved in deionized water to manufacture a vehicle and thereafter the vehicle was mixed with the Dispersion Element 10 followed by filtration with a filter having an opening of 1 µm to obtain Ink for inkjet recording.

Example 11

Dispersion Element 11

A Dispersion Element 11 having a pigment concentration of 15% by weight was manufactured in the same manner as in Example 2 except that the dispersant of Example 2 was changed to the dispersant represented by the Chemical Formula 3-4.

Ink Recipe

| | |
|---|---|
| Dispersion Element 11 | 40.0 parts |
| Glycerin | 20.0 parts |
| 3-methyl-1,3-butane diol | 5.0 parts |
| 3-ethyl-3-hydroxymethyl oxetane | 10.0 parts |
| N,N-dimethyl-β-methoxy propion amide | 5.0 parts |
| 2-ethyl-1,3-hexane diol | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 16.4 parts |

The materials other than the Dispersion Element 11 were dissolved in deionized water to manufacture a vehicle and thereafter the vehicle was mixed with the Dispersion Element 11 followed by filtration with a filter having an opening of 1 µm to obtain Ink for inkjet recording.

Example 12

Dispersion Element 12

A Dispersion Element 12 having a pigment concentration of 15% by weight was manufactured in the same manner as in Example 6 except that the dispersant of Example 6 was changed to the dispersant represented by the Chemical Formula 3-5.

Ink Recipe

| | |
|---|---|
| Dispersion Element 12 | 40.0 parts |
| Glycerin | 20.0 parts |
| Ethylene glycol monobutyl ether | 10.0 parts |
| 2-pyrolidone | 5.0 parts |
| 1,3-butane diol | 5.0 parts |
| 2-ethyl-1,3-hexane diol | 2.0 parts |
| Surfactant represented by the Chemical Formula 5 | 0.05 parts |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water | 17.35 parts |

The materials other than the Dispersion Element 12 were dissolved in deionized water to manufacture a vehicle and thereafter the vehicle was mixed with the Dispersion Element 12 followed by filtration with a filter having an opening of 1 µm to obtain Ink for inkjet recording.

Comparative Example 1

Dispersion Element 13

A Dispersion Element 13 having a pigment concentration of 15% by weight was manufactured in the same manner as in Example 8 except that the dispersion processing time of the ultra aspec mill (UAMO 15 type, manufactured by KOTOBUKI INDUSTRIES) was changed to 20 minutes.

Ink Recipe

Ink for inkjet recording was manufactured in the same manner as in Example 8 except that the Dispersion Element 8 was changed to the Dispersion Element 13.

Comparative Example 2

Dispersion Element 14

A Dispersion Element 14 was manufactured in the same manner as in Example 2 except that the processing time of the ultrasonic homogenizer was changed from 1 hour to 2 hours.

Ink Recipe

Ink for inkjet recording was manufactured in the same manner as in Example 2 except that the Dispersion Element 2 was changed to the Dispersion Element 14.

Comparative Example 3

Dispersion Element 15

A Dispersion Element 15 was manufactured in the same manner as in Example 6 except that the pigment of Example 6 was changed to Pigment Red No. 81 (manufactured by) represented by Dainichiseika Color & Chemicals Mfg. Co., Ltd.).

Ink Recipe

Ink 15 for inkjet recording was manufactured in the same manner as in Example 6 except that the Dispersion Element 6 was changed to the Dispersion Element 13.

Comparative Example 4

Dispersion Element 16

A Dispersion Element 16 was manufactured in the same manner as in Example 4 except that the processing time of the ultrasonic homogenizer was changed from 1 hour to 20 minutes.

Ink Recipe

Ink for inkjet recording was manufactured in the same manner as in Example 4 except that the Dispersion Element 4 was changed to the Dispersion Element 16

Comparative Example 5

Dispersion Element 17

A Dispersion Element 17 having a pigment concentration of 15% by weight was manufactured in the same manner as in Example 3 except that the dispersion processing time of the ultra aspec mill (UAMO 15 type, manufactured by KOTO-BUKI INDUSTRIES CO., LTD.) was changed from 1 hour to 20 minutes.

Ink Recipe

Ink for inkjet recording was manufactured in the same manner as in Example 3 except that the Dispersion Element 3 was changed to the Dispersion Element 17.

Comparative Example 6

Pigment Derivative

| Hostaperm Pink EB trans. (manufactured by Clariant Japan K.K.) | 60 parts |
| Fuming sulfuric acid (28% by weight $SO_3$) | 156 parts |
| Strong sulfuric acid (98% by weight $H_2SO_4$) | 624 parts |

Using the method of Example 1 disclosed in JP-2007-169359-A, the fuming sulfuric acid and the strong sulfuric acid were mixed and a pigment (Hostaperm Pink EB trans.) was poured in to the mixture while stirring at room temperature. After four hour stirring, the resultant was poured into 1,500 parts of ice water. After 30 minute aging, the product was filtrated followed by washing with 300 parts of pure water. The resultant was placed into 2,000 parts of pure water and the pH of the system was adjusted to pH 7 or higher. Subsequent to filtration, the obtained wet crystal was dried at 80° C. followed by repeating washing, filtration, and drying 10 times to obtain 65 parts by weight of a pigment derivative RS-A.

Thereafter, RSA was mixed with pure water followed by dialysis using a dialysis module to obtain a pigment derivative RS-Ad.

Dispersion Element 18

| Hostaperm Pink EB trans. (manufactured by Clariant Japan K.K.) | 96 parts |
| Rs-Ad (dialysis product of the pigment derivative obtained by sulfonizing the pigment) | 24 parts |
| Triethylene glycol | 180 parts |
| Deionized water | 700 parts |

Using the method of Example 18 disclosed in JP-2007-169359-A, a Dispersion Element 18 was prepared.

Ink Recipe

| Dispersion Element 18 | 41.7 parts |
| Glycerin | 12.0 parts |
| Ethylene glycol | 2.8 parts |

-continued

| Triethanol amine | 0.2 parts |
| Deionized water | 43.3 parts |

Using the method of Example 18 disclosed in JP-2007-169359-A, ink for inkjet recording was prepared.

The evaluation items and the evaluation methods for the dispersion elements and the ink for inkjet recording manufactured in Examples and Comparative Examples are described below.

1. Measuring of Absorbance

A spectrophotometer (U-3310, manufactured by Hitachi Ltd.) was used to measure the absorbance. Pure water was put in a quartz glass cell of the reference and the cell was set in the spectrophotometer. The pigment ink in the present disclosure had a pigment concentration of 6% and the liquid concentrate thereof was not measurable because it was too thick. For this reason, the pigment was diluted with pure water to 1/1,200 and set in the quartz glass cell having a light path length of 10 mm of the spectrophotometer. The cell was set in the spectrophotometer. By scanning the cell at least with a sampling gap of 5 nm or less in the visible light range, an absorption spectroscopy illustrated in FIG. 5 was obtained.

Figure 5:
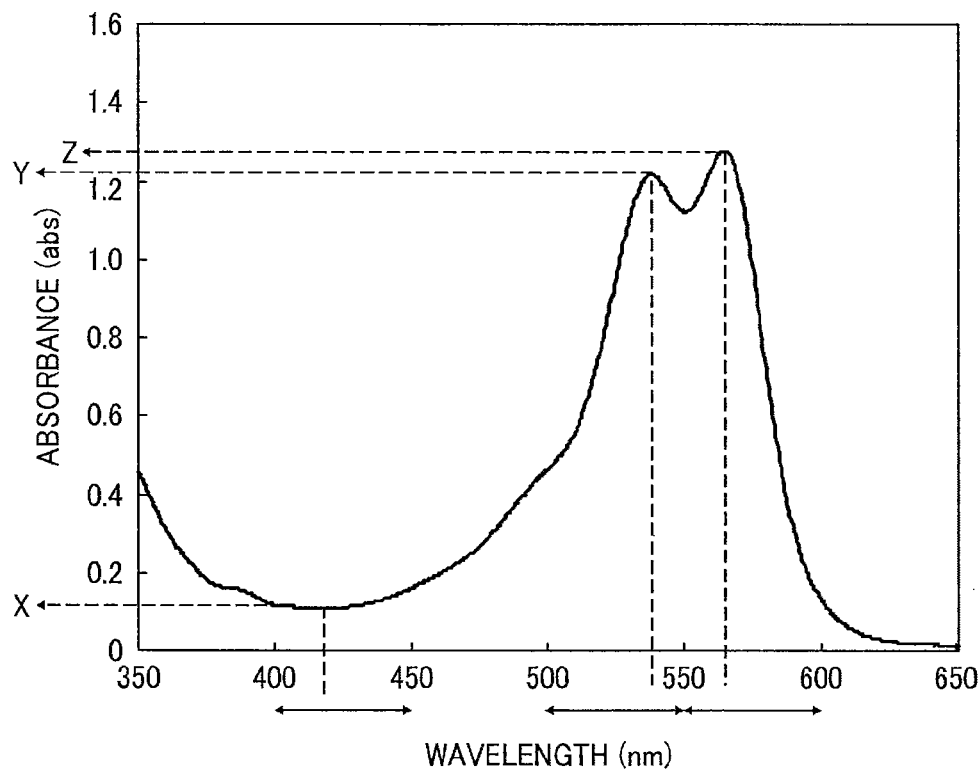
FIG. 5 is a graph from which the absorbances X, Y, and Z are obtained from absorption spectroscopy of Example 1 described later.
Figure 6:
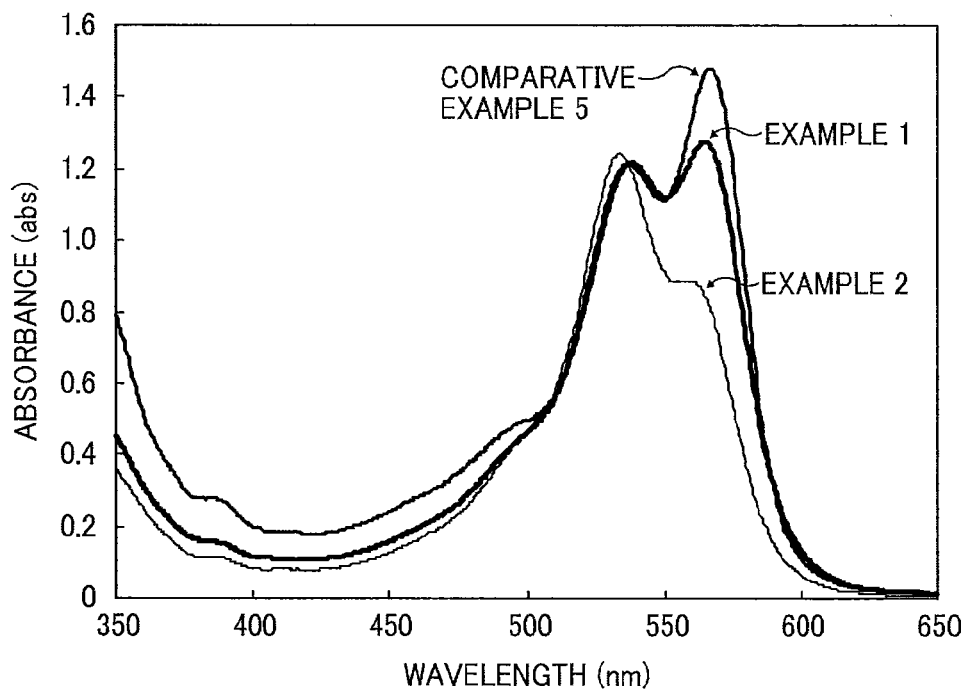
FIG. 6 is graphs of absorption spectroscopy of Examples 1 and 2 and Comparative Example 5.

FIG. 5 is a graph illustrating the absorption spectrum of the ink of Example 1. By reading the absorbance X in the wavelength from 400 nm to 450 nm, the absorbance Y of the maximum peak in the wavelength from 500 nm to 550 nm, and the absorbance Z of the maximum peak in the wavelength from 550 nm to 600 nm, the values in Example 1 were obtained and the results are shown in Table 4. FIG. 6 is graphs of absorption spectroscopy of Examples 1 and 2 and Comparative Example 5. The absorbances X, Y, and Z and the ratios of X/Y and Z/Y of each Example and Comparative Example are shown in Table 4.

2. Evaluation of Discharging Stability

The ink for inkjet recording manufactured in Examples and Comparative Examples was supplied to a printer IPSiO GX e5500, manufacture by RICOH CO., LTD.) having a configuration illustrated in FIGS. 1 and 2 and evaluated about the discharging stability by the following method.

Images were continuously printed for 10 minutes using the printer. After leaving the printer at 50° C. and 60% RH for one month with a moisture retention cap on the head surface while the ink was attached thereto, the head was returned to the same state as before the leaving after cleaning the head.

Thereafter, an intermittent printing test was conducted under the following conditions and the discharging stability was evaluated.

That is, the following printing pattern chart was printed on 20 sheets continuously and printing was halt for 20 minutes. This cycle was repeated 50 times to print the chart on 1,000 sheets in total and thereafter the printing pattern chart was printed on one more sheet, which was observed with eyes to evaluate the image with regard to streaks, white out, disturbance of spraying of 5% chart solid portion according to the following criteria. The printing pattern had a printing area of 5% for each color in the entire imaging area of the sheet and was printed with each ink under 100% duty. The printing condition was that the recording density was 600 dpi×300 dpi with one pass printing. In the evaluation criteria, E and G are allowable. The results are shown in Table 5.

Evaluation Criteria

E (Excellent): No streaks, no white out, no spraying disturbance observed in the solid portion G (Good): Slight streaks, white out, spraying disturbance observed in the solid portion F (Fair): Streaks, white out, spraying disturbance observed in the solid portion B (Bad): Streaks, white out, spraying disturbance observed all over the solid portion 3. Measuring of Curl The ink for inkjet recording manufactured in Examples and Comparative Examples was installed in a printer IPSiO GX e5500, manufacture by RICOH CO., LTD.) having a configuration illustrated in FIGS. 1 and 2 and evaluated about the discharging stability by the following method. The attachment amount of ink was adjusted from 300 mg to 340 mg/A4 and the image obtained 10 minutes after printing was placed on a flat desk with the image face down to measure the distance between the surface of the edge and the reference surface by a scale. The average of the measurement values at the right edge and the left edge of the paper was determined as the amount of curl. The evaluation results by the following criteria are shown in Table 5. E and G are allowable.

Evaluation Sheet

Recording Sheet A: BP-PAPER GF-500 (A4, manufactured by Canon Inc.)

Evaluation Criteria

| | |
|---|---|
| E (Excellent): | Less than 5 mm |
| G (Good): | 5 mm to less than 20 mm |
| F (Fair): | 20 mm to less than 50 mm |
| B (Bad): | Both edges so curled that paper has a cylinder-like form |

4. Measuring of Saturation

The ink for inkjet recording manufactured in Examples and Comparative Examples were supplied to an inkjet printer (IPSiO GX e5500, manufactured by RICOH CO., LTD.) and a solid image was printed with one pass. The solid image was printed on the following recording media A, B, and C. After the image was dried, the luminance thereof was measured by a reflection type color spectrodensitometer (X-Rite 938, manufactured by X-Rite Incorporate).

From the obtained values a* and b*, the saturation $C^* (=\{(a^*)^2+(b^*)^2\}^{1/2})$ was calculated and the ratio $k (=C^*/C^*_0)$ of $C^*$ to $C^*_0 = 74.55$, which is the saturation value of standard color (Japan Color ver. 2) was also calculated followed by evaluation according to the following criteria. The results are shown in Table 5. E and G are allowable in the evaluation criteria.

Evaluation Sheet

Recording Sheet A: BP-PAPER GF-500 (A4, manufactured by Canon Inc.)

Recording Sheet B: MIRROR COAT Platinum (manufactured by OJI PAPER CO., LTD.)

Recording Sheet C: Crispia (manufactured by Seiko Epson Corp.)

Evaluation Criteria

E (Excellent): k≥1.1
G (Good): 1.1>k≥1.0
G (Good): 1.0>k≥0.9
B (Bad): 0.9>k

5. Measuring of Gloss (60°)

The ink for inkjet recording manufactured in Examples and Comparative Examples were supplied to an inkjet printer (IPSiO GX e5500, manufactured by RICOH CO., LTD.) and a solid image was printed with one pass.

The solid image was printed on the following recording media B and C. After the image was dried, the 60° gloss of the image was measured by BYK GARDNER 4501 (manufactured by BYK GARDNER CO., LTD.). The difference ΔG $(=|G_0-G|)$ of the gloss X between the gloss G0 of 0 gradation (surface of a recording medium on which no image was printed) and each gradation other than 0 gradation was calculated and evaluated according to the following evaluation criteria. The results are shown in Table 5. E and G are allowable in the evaluation criteria.

Evaluation Sheet

Recording Sheet B: MIRROR COAT Platinum (manufactured by OJI PAPER CO., LTD.): $G_0$=73.8

Recording Sheet C: Crispia (manufactured by Seiko Epson Corp.): $G_0$=64.4

Evaluation Criteria

E (Excellent): |ΔG|≤10
G (Good): 10<|ΔG|≤20
F (Fair): 20<|ΔG|≤40
B (Bad): 40<|ΔG|

6. Light Resistance

The ink for inkjet recording manufactured in Examples and Comparative Examples were supplied to an inkjet printer (IPSiO GX e5500, manufactured by RICOH CO., LTD.) and a solid image was printed with one pass.

The following recording sheet C was used for evaluation. After printing and drying, the image was irradiated at a black panel temperature of 63° C. for 24 hours by a Xenon feed meter. The change in the image density before and after the irradiation was measured by a reflection type color spectrodensitometer (manufactured by X-Rite Incorporated) to obtain a color deterioration ratio t (%) according to the following Relation.

$t$ (%)=[1−(image density after irradiation)/(image density before irradiation)]×100

The results are shown in Table 5. E and G are allowable in the evaluation criteria.

Evaluation Sheet

Recording Sheet C: Crispia (manufactured by Seiko Epson Corp.)

Evaluation Criteria

E (Excellent): t≤5%
G (Good): 5%<t≤10%
F (Fair): 10%<t≤20%
B (Bad): 20%<t

TABLE 3

| | | Ink Composition | | | | | | | | | |
|---|---|---|---|---|---|---|---|---|---|---|---|
| | Liquid | | | | | Aqueous Solvent | | | | | |
| Ink | Dispersion | GLY | EGMBE | EG | 2P | 13BD | MBD | EHO | IPG | DMPA | DBPA |
| Example 1 | 40% | 20% | | | | | | 10% | | 10% | |
| Example 2 | 40% | 20% | | | | 5% | | | 10% | | 5% |
| Example 3 | 40% | 20% | 15% | | 5% | | | | | | |
| Example 4 | 40% | 20% | | | | | 10% | 5% | | 10% | |
| Example 5 | 40% | 20% | | | 5% | | 15% | | | | |
| Example 6 | 40% | 20% | | | | 10% | 10% | | | | |

TABLE 3-continued

| | | | | | | | | | |
|---|---|---|---|---|---|---|---|---|---|
| Example 7 | 40% | 20% | 10% | | | | 5% | | 5% |
| Example 8 | 40% | 20% | | | 20% | | | | |
| Example 9 | 40% | 20% | | | | | 5% | 10% | 5% |
| Example 10 | 40% | 20% | | | 20% | | | | |
| Example 11 | 40% | 20% | | | | 5% | 10% | | 5% |
| Example 12 | 40% | 20% | 10% | 5% | 5% | | | | |
| Comparative Example 1 | 40% | 20% | | | 20% | | | | |
| Comparative Example 2 | 40% | 20% | | | 5% | | 10% | | 5% |
| Comparative Example 3 | 40% | 20% | | | | 10% | 10% | | |
| Comparative Example 4 | 40% | 20% | | | | 10% | 5% | 10% | |
| Comparative Example 5 | 40% | 20% | 15% | 5% | | | | | |
| Comparative Example 6 | 41.7% | 12% | | 2.8% | | | | | |

| | Ink Composition | | | | | | |
|---|---|---|---|---|---|---|---|
| | Penetrating Agent | | | pH adjuster | | Anti-septic and anti- | Deionized |
| Ink | 2E13HD | LS | DSN | AEPD | TEA | fungal agent LV | water |
| Example 1 | 2% | | 0.05% | 0.5% | | 0.1% | 17.35% |
| Example 2 | 2% | | 0.05% | 0.5% | | 0.1% | 17.35% |
| Example 3 | 2% | 1% | | 0.5% | | 0.1% | 16.40% |
| Example 4 | 2% | 1% | | 0.5% | | 0.1% | 11.40% |
| Example 5 | 2% | | 0.05% | 0.5% | | 0.1% | 17.35% |
| Example 6 | 2% | 1% | | 0.5% | | 0.1% | 16.40% |
| Example 7 | 2% | | 0.05% | 0.5% | | 0.1% | 17.35% |
| Example 8 | 2% | 1% | | 0.5% | | 0.1% | 16.40% |
| Example 9 | 2% | | 0.05% | 0.5% | | 0.1% | 17.35% |
| Example 10 | 2% | 1% | | 0.5% | | 0.1% | 16.40% |
| Example 11 | 2% | 1% | | 0.5% | | 0.1% | 16.40% |
| Example 12 | 2% | | 0.05% | 0.5% | | 0.1% | 17.35% |
| Comparative Example 1 | 2% | 1% | | 0.5% | | 0.1% | 16.40% |
| Comparative Example 2 | 2% | | 0.05% | 0.5% | | 0.1% | 17.35% |
| Comparative Example 3 | 2% | 1% | | 0.5% | | 0.1% | 16.40% |
| Comparative Example 4 | 2% | 1% | | 0.5% | | 0.1% | 11.40% |
| Comparative Example 5 | 2% | 1% | | 0.5% | | 0.1% | 16.40% |
| Comparative Example 6 | | | | | 0.2% | | 43.30% |

GLY: Glycerin
EGMBE: Ethylene glycol monobutyl ether
EG: Ethylene glycol
2P 2-pyrrolidone
13BD 1,3-butane diol
MBD 3-methyl-1,3-butane diol
EHO 3-ethyl-3-hydroxymethyl oxetane
IPG Isopropylidene glycerol
DMPA N,N-dimethyl-β-methoxy propionamide
DBPA N,N-dimethyl-β-butoxy propionamide
2E13HD 2-ethyl-1,3-hexane diol
LS Emulgen LS-106 (polyoxyethylene polyoxypropylene alkyl ether, manufactured by KAO Corporation)
DSN Chemical Formula 5
APED 2-amino-2-ethyl-1,3-propane diol
TEA triethanol amine
LV Proxel™ LV (anti-septic and anti-fungal agent, manufactured by ARCH CHEMICALS JAPAN, INC.)

TABLE 4

| | X/Y | Z/Y | X | Y | Z |
|---|---|---|---|---|---|
| Example 1 | 0.090 | 1.049 | 0.110 | 1.220 | 1.280 |
| Example 2 | 0.065 | 0.718 | 0.080 | 1.240 | 0.890 |
| Example 3 | 0.117 | 1.042 | 0.140 | 1.200 | 1.250 |
| Example 4 | 0.050 | 0.765 | 0.060 | 1.190 | 0.910 |
| Example 5 | 0.104 | 1.040 | 0.130 | 1.250 | 1.300 |
| Example 6 | 0.080 | 0.976 | 0.100 | 1.250 | 1.220 |
| Example 7 | 0.106 | 1.000 | 0.130 | 1.230 | 1.230 |
| Example 8 | 0.119 | 1.017 | 0.140 | 1.180 | 1.200 |
| Example 9 | 0.100 | 1.008 | 0.12 | 1.200 | 1.210 |
| Example 10 | 0.112 | 1.034 | 0.13 | 1.160 | 1.200 |
| Example 11 | 0.067 | 0.767 | 0.08 | 1.200 | 0.920 |
| Example 12 | 0.089 | 0.968 | 0.11 | 1.240 | 1.200 |

TABLE 4-continued

|  | X/Y | Z/Y | X | Y | Z |
|---|---|---|---|---|---|
| Comparative Example 1 | 0.118 | 1.109 | 0.140 | 1.190 | 1.320 |
| Comparative Example 2 | 0.056 | 0.688 | 0.070 | 1.250 | 0.860 |
| Comparative Example 3 | 0.137 | 1.048 | 0.170 | 1.240 | 1.300 |
| Comparative Example 4 | 0.048 | — | 0.060 | 1.260 | No peak |
| Comparative Example 5 | 0.150 | 1.233 | 0.180 | 1.200 | 1.480 |
| Comparative Example 6 | 0.169 | 0.965 | 0.175 | 1.036 | 1.000 |

TABLE 5

|  | Discharging Stability | Curling Sheet A | Saturation | | | Gloss | | Light Resistance |
|---|---|---|---|---|---|---|---|---|
|  |  |  | Sheet A | Sheet B | Sheet C | Sheet B | Sheet C | Sheet C |
| Example 1 | E | E | E | E | E | G | E | E |
| Example 2 | E | E | G | E | E | E | E | G |
| Example 3 | E | G | E | E | E | G | G | E |
| Example 4 | E | E | G | G | E | E | E | G |
| Example 5 | E | G | E | E | G | G | G | E |
| Example 6 | E | G | G | G | G | E | E | G |
| Example 7 | G | E | G | G | E | G | G | E |
| Example 8 | G | G | E | G | G | G | G | E |
| Example 9 | G | E | G | E | G | G | G | E |
| Example 10 | G | G | E | G | G | E | G | E |
| Example 11 | E | E | G | E | E | G | E | G |
| Example 12 | E | G | E | G | G | G | G | E |
| Comparative Example 1 | F | G | G | F | F | B | B | E |
| Comparative Example 2 | E | E | F | E | E | G | E | F |
| Comparative Example 3 | F | F | G | G | F | F | B | G |
| Comparative Example 4 | E | E | G | E | E | E | E | B |
| Comparative Example 5 | G | G | F | G | F | F | F | E |
| Comparative Example 6 | E | B | F | G | E | B | F | E |

In the ink composition using the quinacridone pigment represented by the Chemical Formula 1, by making the ratios X/Y and Z/Y in the range of Relations 1 and 2, wherein X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm, images having a vivid and clear coloring and gloss can be formed not only on plain paper but also on special glossy paper or coated paper and it is possible to provide an ink composition having a sufficient light resistance and an inkjet recording method and printed matter using the ink composition.

Having now fully described embodiments of the present invention, it will be apparent to one of ordinary skill in the art that many changes and modifications can be made thereto without departing from the spirit and scope of embodiments of the invention as set forth herein.

What is claimed is:
1. An ink composition comprising:
a pigment;
a hydrosoluble solvent; and
water,
wherein the pigment comprises a compound represented by the following Chemical Formula 1-1:

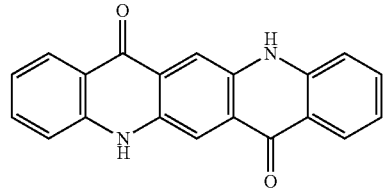

Chemical Formula 1-1 wherein the ink composition satisfies the following relations 1 and 2:

$$0.050 \leq X/Y \leq 0.120 \quad \text{Relation 1}$$

$$0.700 \leq Z/Y \leq 1.050 \quad \text{Relation 2}$$

where X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm.

2. The ink composition according to claim 1, wherein the composition satisfies the following relation 3:

$$0.050 \leq X/Y \leq 0.117 \quad \text{Relation 3.}$$

3. The ink composition according to claim 1, wherein the pigment consists of a compound represented by the following chemical formula 1-1:

Chemical Formula 1-1

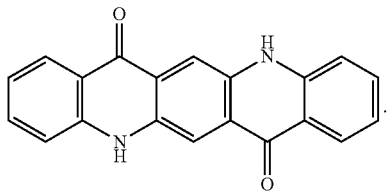

4. The ink composition according to claim 1, wherein the hydrosoluble solvent comprises 2-pyrrolidone.

5. An inkjet recording method comprising:
applying thermal energy to the ink composition of claim 1; and
discharging the ink composition to form an image on a recording medium.

6. An inkjet recording method comprising:
applying mechanical energy to the ink composition of claim 1; and
discharging the ink composition to form an image on a recording medium.

7. Printed matter comprising:
a medium; and
an image formed on the medium with the ink composition of claim 1.

8. Printed matter comprising:
a medium; and
an image formed on the medium utilizing the inkjet recording method of claim 5.

9. An ink cartridge comprising:
a container having the ink composition of claim 1 therein.

10. An inkjet recording device comprising:
the ink cartridge of claim 9.

11. An ink composition comprising:
a pigment;
a hydrosoluble solvent comprising 2-pyrrolidone; and
water,
wherein the pigment comprises a compound represented by the following chemical formula 1-1:

Chemical formula 1-1

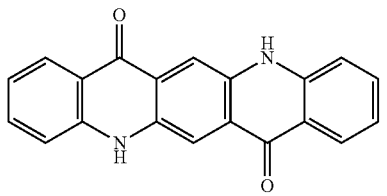

wherein the ink composition satisfies the following relations 1 and 2:

$$0.050 \leq X/Y \leq 0.120 \quad \text{Relation 1}$$

$$0.700 \leq Z/Y \leq 1.050 \quad \text{Relation 2}$$

where X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm.

12. An ink composition comprising:
a pigment;
a hydrosoluble solvent comprising 2-pyrrolidone; and
water,
wherein the pigment consists of a compound represented by the following chemical formula 1-1:

Chemical formula 1-1

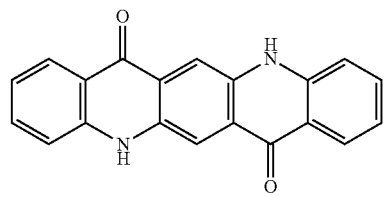

wherein the ink composition satisfies the following relations 1 and 2:

$$0.050 \leq X/Y \leq 0.120 \quad \text{Relation 1}$$

$$0.700 \leq Z/Y \leq 1.050 \quad \text{Relation 2}$$

where X represents a minimum absorbance in a wavelength range of from 400 nm to 450 nm, Y represents an absorbance of a maximum peak in a wavelength range of from 500 nm to 550 nm, and Z represents an absorbance of a maximum peak in a wavelength range of from 550 nm to 600 nm.

* * * * *